C. L. BAIR.
EXPANSION BOLT.
APPLICATION FILED FEB. 18, 1918.
1,276,708. Patented Aug. 27, 1918.
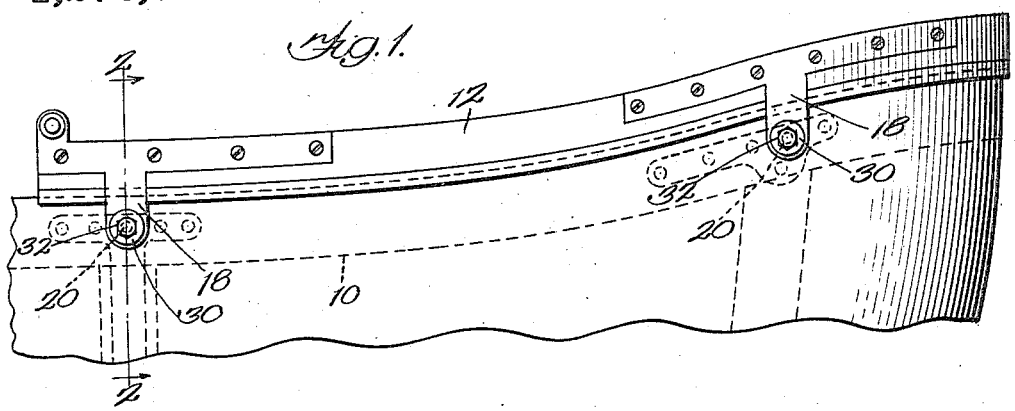
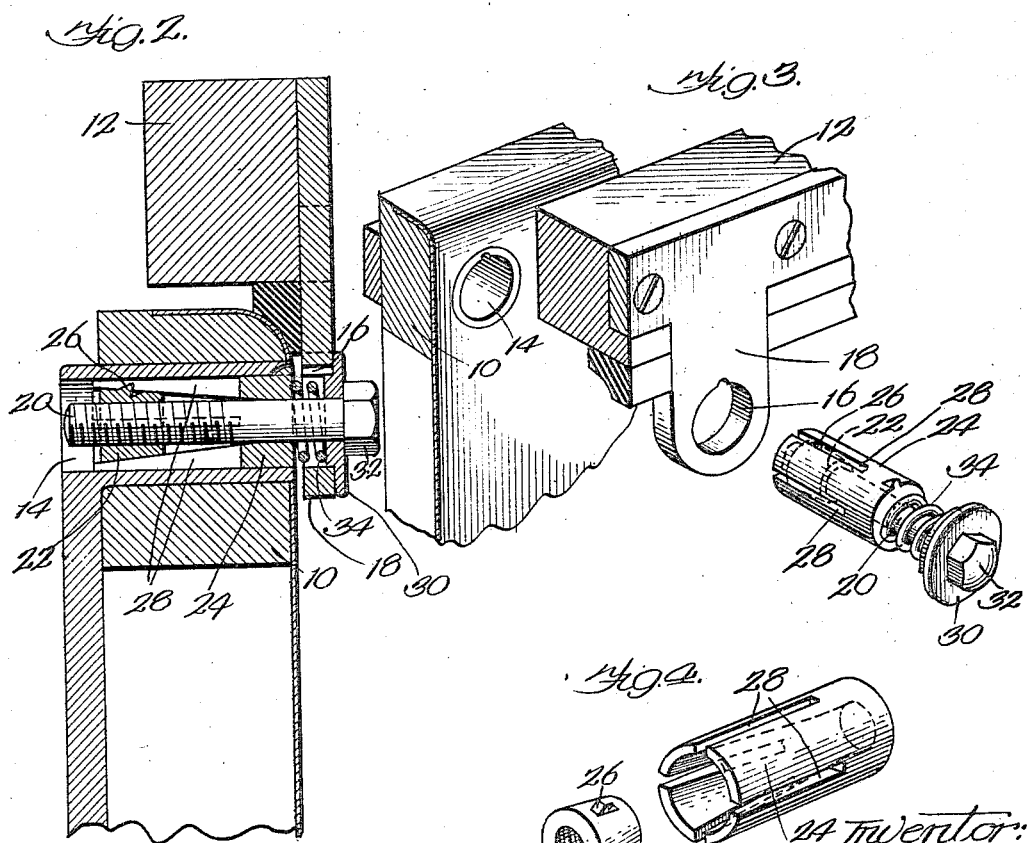
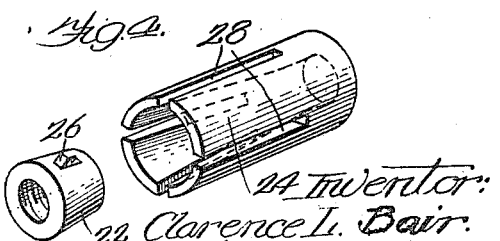
Inventor:
Clarence L. Bair.
By Cheever & Cox
Att'ys.

UNITED STATES PATENT OFFICE.

CLARENCE L. BAIR, OF ST. JOSEPH, MICHIGAN, ASSIGNOR TO AUTO SPECIALTIES MANUFACTURING CO., OF SAN FRANCISCO, CALIFORNIA, A CORPORATION OF CALIFORNIA.

EXPANSION-BOLT.

1,276,708.

Specification of Letters Patent. Patented Aug. 27, 1918.

Application filed February 13, 1918. Serial No. 217,774.

*To all whom it may concern:*

Be it known that I, CLARENCE L. BAIR, a citizen of the United States, residing at St. Joseph, in the county of Berrien and State of Michigan, have invented a certain new and useful Improvement in Expansion-Bolts, of which the following is a specification.

My invention relates to expansion bolts, or equivalent mechanism, for detachably connecting two adjacent members together where it is desirable that when the parts to be connected together are separated, the attaching mechanism shall also be readily removable, and in which, when the members are attached together, the attaching devices shall be as compact and simple as possible.

The object of the invention is to provide mechanism of this class which can be easily and cheaply made, which is simple in operation, and not readily liable to get out of order.

The invention consists in the mechanism for carrying out the foregoing objects, and particularly, in an expansion bolt device for use in the bodies of automobiles, and the like, in which a preliminary rotation of the locking nut first secures the bolt device in place in one of the members to be secured so that subsequent rotation of the locking nut operates efficiently to force the second member to be secured into engagement with the first. The invention further consists in the features and details of construction which will be hereafter more fully set forth in the specification and claims.

Referring to the drawings, in which similar numerals indicate the same parts throughout the several views, Figure 1 is a side view of an automobile body having a supplemental part, as for instance, the frame of a Victoria top detachably secured thereto by the mechanism of this invention.

Fig. 2 is an enlarged sectional detail view taken through the securing mechanism, on, for instance, the line 2—2, of Fig. 1.

Fig. 3 is a perspective view of the two automobile body parts and the bolt device, separated one from the other.

Fig. 4 is a perspective view of the expansible cylinder and the expanding cone on the securing mechanism.

When an automobile main body 10 is to be equipped with a supplemental body 12 which can be removed at will, the problem arises of providing ready means for detachably securing one to the other which will do its securing or fastening work efficiently and, at the same time, be readily removed when the parts are separated. In the device of this invention the result is accomplished by providing, through the first member 10 to be secured, a bolt receiving hole or perforation 14 in alinement with a corresponding hole 16 in a part 18 carried by the second member 12 to be secured, and by inserting through these perforations 14 and 16 the novel form of expansion bolt device here shown and described.

The securing mechanism proper consists in a screw threaded bolt 20 having threaded on one end a conical expanding member 22 fitting inside a cylindrical expansible member 24, the two being prevented from rotating one or the other, but permitted to slide lengthwise one or the other through the agency of a lug 26 on one of the members traveling in a slot 28 in the other. In the particular case here illustrated, the lug is on the expanding member and the slot is in the expansible member. The opposite screw threaded end of the bolt 20 carries a washer 30 and a nut 32, hereafter referred to as a clamping member, adapted to bear against the outside of the member 18 of the second member 12 to be secured. On the bolt 20 and between the washer 30 and the expansible member 24 is a compression spring 34 of greater expanded thickness than the thickness of the member 18 which is to be attached to the automobile body.

The result of the foregoing construction is that when it is desired to assemble together the two automobile body parts, the operator, after placing them in the position shown in Fig. 2, inserts the bolt mechanism with all parts loose inside of the opening 14—16. He now applies a wrench to the nut 32 and starts to rotate it. The first two or three turns of the nut slightly compresses spring 34, thus tending to pull expander member 22 into expandible member 24 and this operation continues until the leaves of the expandible member have been forced outward toward the walls of hole 14 in member 10, sufficiently to cause the member 24 to grip said wall. Further rotation of the nut 32 now simply compresses spring 34 as much as is necessary to bring member 18 of the supplemental automobile body 12 into rigid contact with member 10.

To remove the device it is only necessary to reverse the order of operations heretofore described, finally striking the right hand end of bolt 20, viewed in Fig. 2, to drive the expanding member 22 out of the expansible member 24 and thus releasing the entire device.

It will be seen that the securing device does not take up any excess space when in use, and is entirely removable and out of the way when the parts are separated.

Having thus described my invention, what I claim as new and desire to secure by Letters Patent, is:

1. In a device of the class described, the combination of a screw threaded bolt, an expansible member slidable thereon, an expanding member threaded on one end of the bolt and entering the expansible member to expand it, means preventing rotation of the expanding with reference to the expansible member while permitting longitudinal movement of the two, a clamping member on the other end of the bolt, and a compressible spring on said bolt between the expansible member and the clamping member, for the purposes set forth.

2. In a device of the class described, the combination of a first member and a second member to be secured side by side, there being corresponding registering bolt holes in the two members, a screw threaded bolt through said bolt holes, an expansible member on said bolt inside the first member, a clamping member on the bolt outside of and bearing on the second member, a compression spring of greater length than the thickness of the second member, on said bolt through the second member and between the nut device and the expansion member, a conical expansion member on the bolt engaging the expansible member to expand it, and means for preventing rotation while permitting longitudinal movement of the conical member with reference to the expansion member, for the purposes set forth.

3. In a device of the class described, an expansible mechanism for insertion within an opening where it is to secure itself, a clamping member in suitable operative relation to the expansible mechanism, a compressible spring between the clamping member and the expansible mechanism, a bolt connecting the expansible mechanism with the clamping member, and an expanding device engaging the expansible member, for the purposes set forth.

In witness whereof, I have hereunto subscribed my name in the presence of two witnesses.

CLARENCE L. BAIR.

Witnesses:
C. B. WINSLOW,
E. J. MARTIN.